(12) United States Patent
Massoudi

(10) Patent No.: US 7,581,205 B1
(45) Date of Patent: Aug. 25, 2009

(54) SYSTEM AND METHOD OF IMPLEMENTING A CUSTOMIZABLE SOFTWARE PLATFORM

(75) Inventor: Arash Massoudi, Dublin, CA (US)

(73) Assignee: Nextaxiom Technology, Inc., San Francisco, CA (US)

( * ) Notice: Subject to any disclaimer, the term of this patent is extended or adjusted under 35 U.S.C. 154(b) by 488 days.

(21) Appl. No.: 10/711,706

(22) Filed: Sep. 30, 2004

Related U.S. Application Data

(60) Provisional application No. 60/481,444, filed on Sep. 30, 2003.

(51) Int. Cl.
*G06F 9/44* (2006.01)
(52) U.S. Cl. .................. 717/106; 717/107; 717/108
(58) Field of Classification Search .......... 717/106–108
See application file for complete search history.

(56) References Cited

U.S. PATENT DOCUMENTS

| | | | |
|---|---|---|---|
| 5,758,062 A | 5/1998 | McMahon et al. | |
| 5,768,588 A | 6/1998 | Endicott et al. | |
| 5,774,583 A | 6/1998 | Sasaki et al. | |
| 5,805,785 A | 9/1998 | Dias et al. | |
| 6,115,040 A | 9/2000 | Bladow et al. | |
| 6,253,366 B1 | 6/2001 | Mutschler, III | |
| 6,434,598 B1 | 8/2002 | Gish | |
| 6,457,064 B1 | 9/2002 | Huff et al. | |
| 6,563,441 B1 | 5/2003 | Gold | |
| 6,665,677 B1 | 12/2003 | Wotring et al. | |
| 6,684,222 B1 | 1/2004 | Cornelius et al. | |
| 6,691,302 B1 * | 2/2004 | Skrzynski et al. ........... 717/118 |
| 6,697,363 B1 | 2/2004 | Carr | |
| 6,775,822 B1 | 8/2004 | Apte et al. | |
| 6,804,773 B1 | 10/2004 | Grigsby et al. | |
| 6,832,219 B2 | 12/2004 | Lal | |
| 6,917,620 B1 | 7/2005 | Sindhu et al. | |
| 6,925,631 B2 | 8/2005 | Golden | |
| 6,934,712 B2 | 8/2005 | Kiernan et al. | |
| 6,985,939 B2 * | 1/2006 | Fletcher et al. ............. 709/223 |
| 6,996,589 B1 | 2/2006 | Jayaram et al. | |
| 7,035,944 B2 * | 4/2006 | Fletcher et al. ............. 709/250 |
| 7,047,243 B2 | 5/2006 | Cabrera et al. | |
| 7,111,197 B2 | 9/2006 | Kingsbury et al. | |
| 7,159,185 B1 | 1/2007 | Vedula et al. | |
| 7,171,672 B2 | 1/2007 | Just | |

(Continued)

OTHER PUBLICATIONS

David C. Fallside, XLM Schema Part 0: Primer, W3C Recommendations, May 2, 2001 Published by W3C, 2001, p. 1-74.

(Continued)

*Primary Examiner*—Wei Y Zhen
*Assistant Examiner*—Junchun Wu
(74) *Attorney, Agent, or Firm*—Workman Nydegger

(57) ABSTRACT

Methods, systems, frameworks and software products are disclosed for the construction of a service-oriented software platform that can be used for the management, development and service-oriented composition of any software service. The innovative aspect of the system outlined is its uniqueness in using the development capability that it provides to the end-users of the system and its artifacts in constructing the functionality of the system. The result is a highly customizable platform where the behavior of the platform can be overwritten or easily customized at a granular level using the basic functionality of the platform.

30 Claims, 15 Drawing Sheets

U.S. PATENT DOCUMENTS

| | | | |
|---|---|---|---|
| 7,188,155 B2 | 3/2007 | Flurry et al. | |
| 7,194,485 B2 | 3/2007 | Kaipa et al. | |
| 2001/0052108 A1* | 12/2001 | Bowman-Amuah | 717/1 |
| 2002/0052939 A1 | 5/2002 | Lee | |
| 2002/0169889 A1 | 11/2002 | Yang et al. | |
| 2002/0194244 A1 | 12/2002 | Raventos | |
| 2003/0120782 A1 | 6/2003 | Bortoloso et al. | |
| 2003/0217033 A1 | 11/2003 | Sandler et al. | |
| 2003/0233602 A1 | 12/2003 | Lindquist et al. | |
| 2004/0003029 A1 | 1/2004 | Islam et al. | |
| 2004/0015564 A1* | 1/2004 | Williams | 709/219 |
| 2004/0177335 A1* | 9/2004 | Beisiegel et al. | 717/102 |
| 2004/0183838 A1 | 9/2004 | Lahiri | |
| 2004/0239674 A1 | 12/2004 | Ewald et al. | |
| 2004/0243915 A1 | 12/2004 | Doyle et al. | |
| 2005/0015491 A1* | 1/2005 | Koeppel | 709/226 |
| 2005/0015643 A1 | 1/2005 | Davis et al. | |
| 2005/0044197 A1* | 2/2005 | Lai | 709/223 |
| 2005/0050526 A1 | 3/2005 | Dahne-Steuber et al. | |
| 2005/0182779 A1 | 8/2005 | Perry et al. | |

OTHER PUBLICATIONS

Paul V. Biron, XLM Schema Part 2: Datatypes, W3C Recommendations, May 2, 2001 Published by W3C, 2001, p. 1-146.

Yang et al. "Realizing Fault Resilience in Web-Server Cluster", Nov. 2000, IEEE, pp. 1-15.

Ahumada, et al. Specifying Fractal and GCM Conponents with UML, Chilean Society of Computer Science, 2008, SCCC "07, XX, Nov. 8-9, 2007, p. 53-63.

Sun Microsystems, Web Service Made Easier—The Java APIs and Architectures for XML, A Technical Paper White Paper, Published by Sun Microsystems, Inc. Jun. 2002 Revision 3, pp. 1-33.

Service Oriented Programming, from Wikipedia, the free encyclopedia. [online] 8 pages, retrieved from the Internet Jan. 22, 2009 http://en.wikipedia.org/wiki/Service_Oriented_Programming.

* cited by examiner

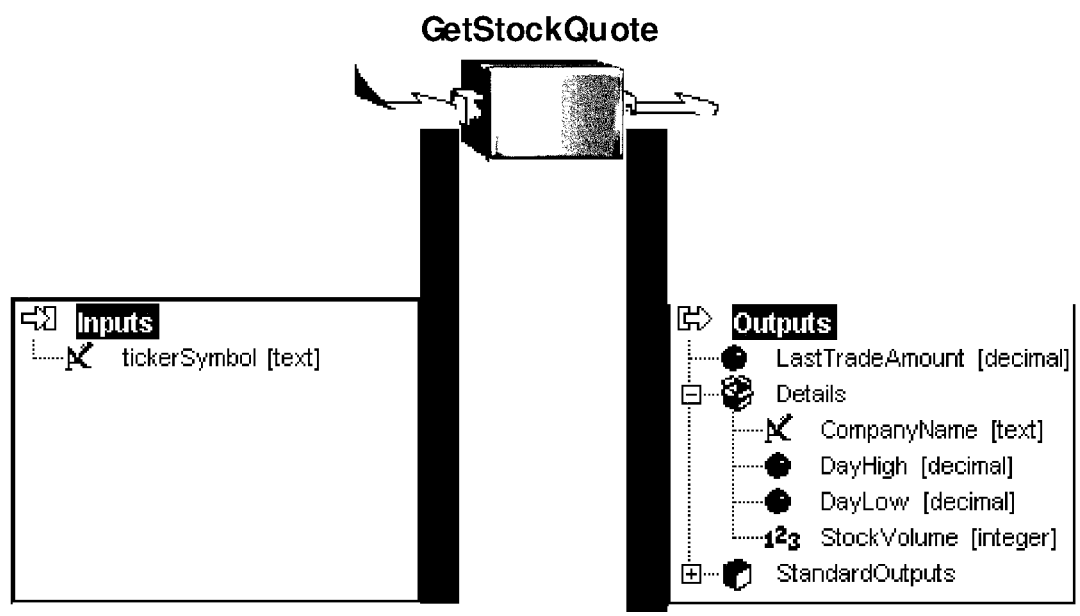
Figure 1: Web service interface for a service named "GetStockQuote"

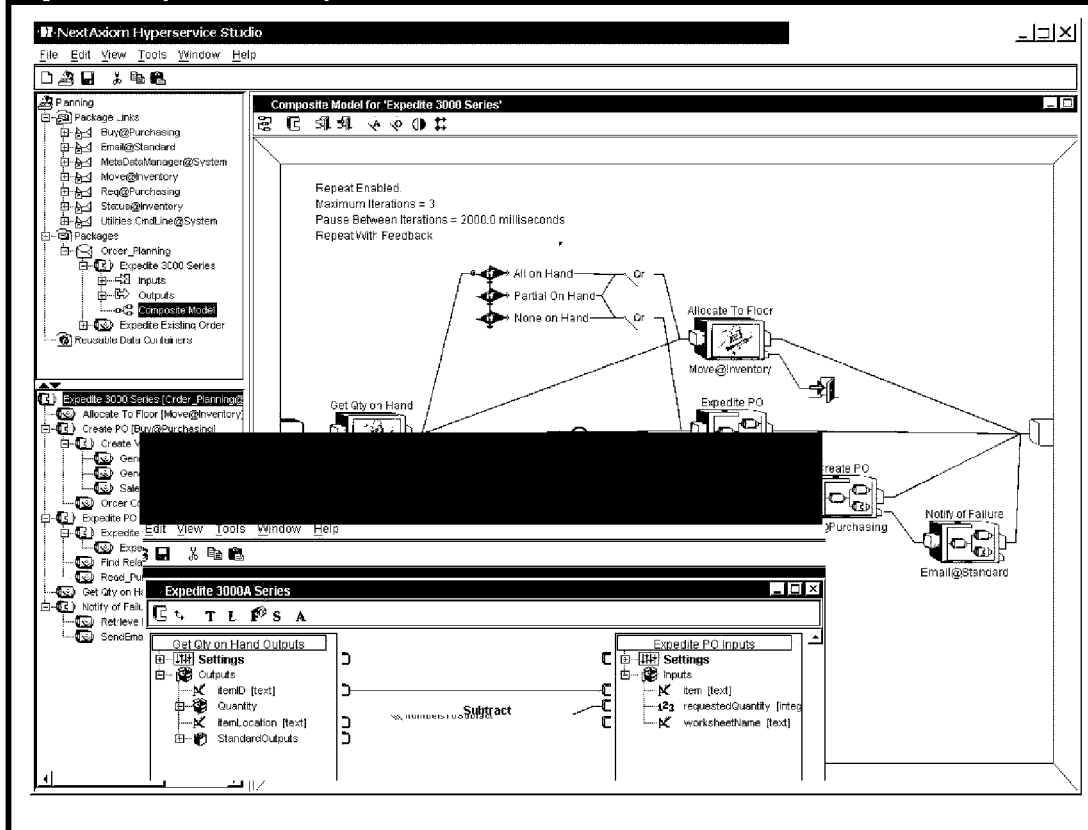

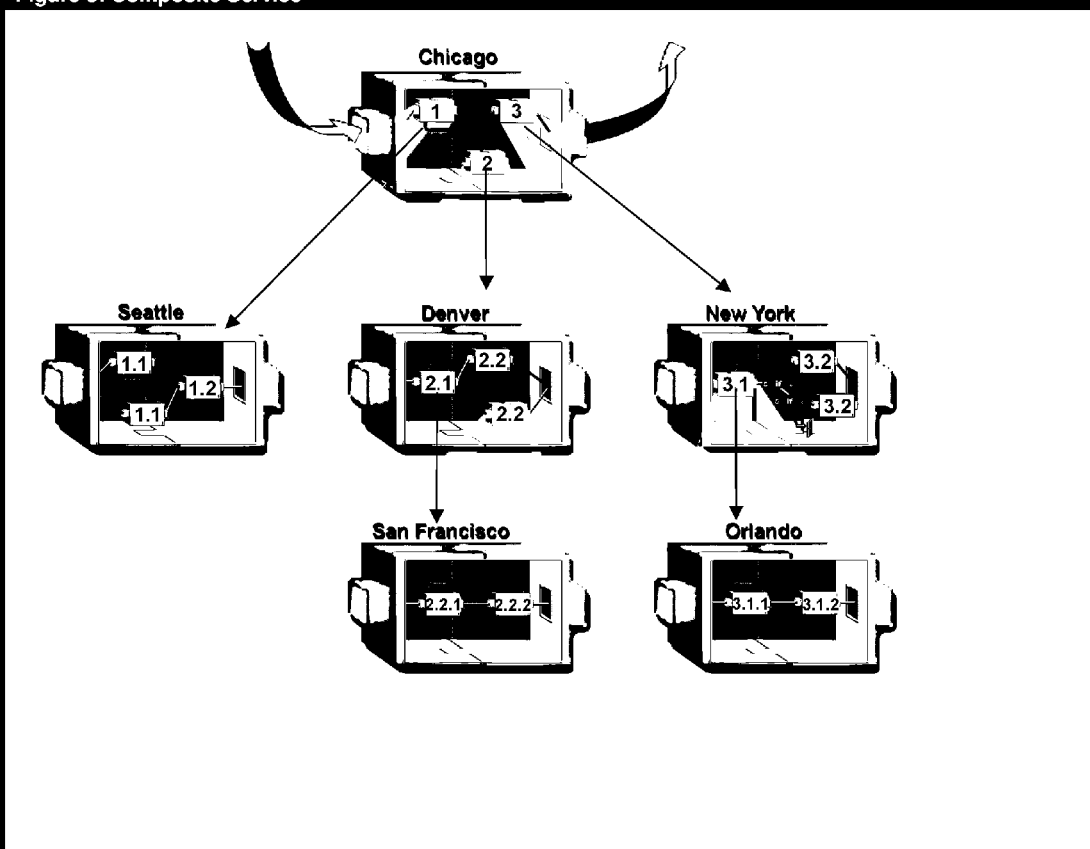

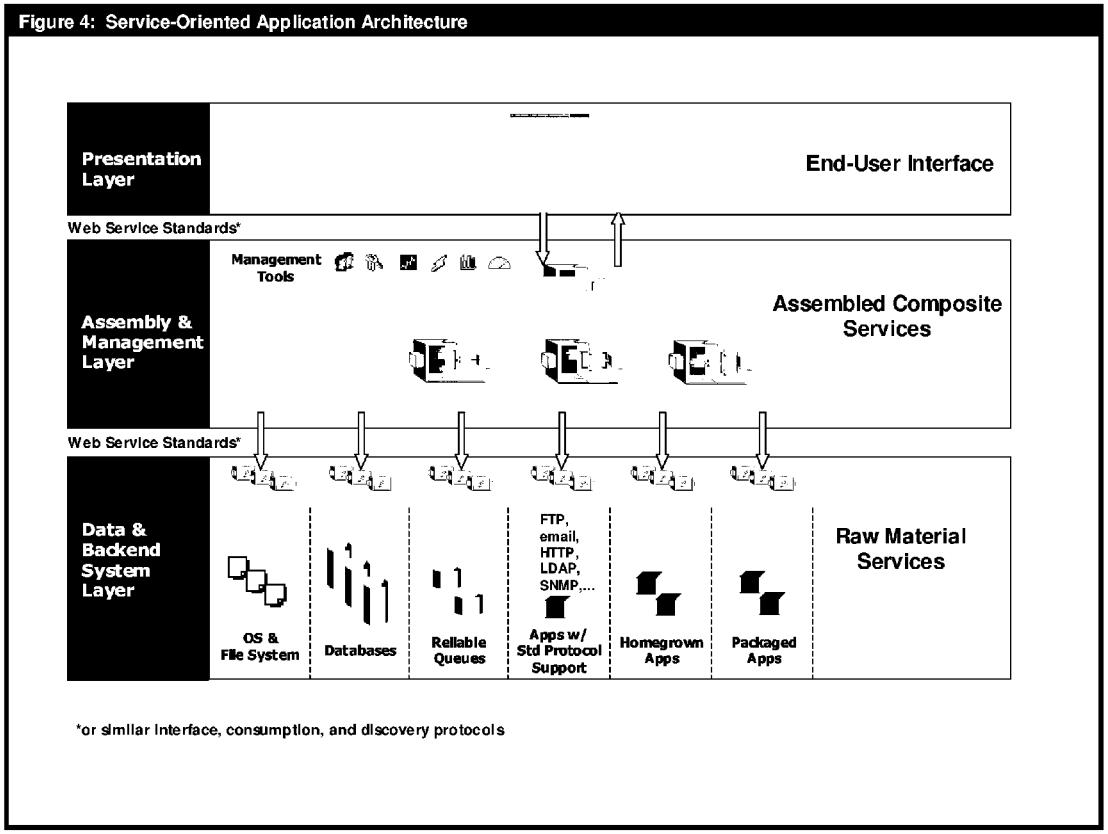

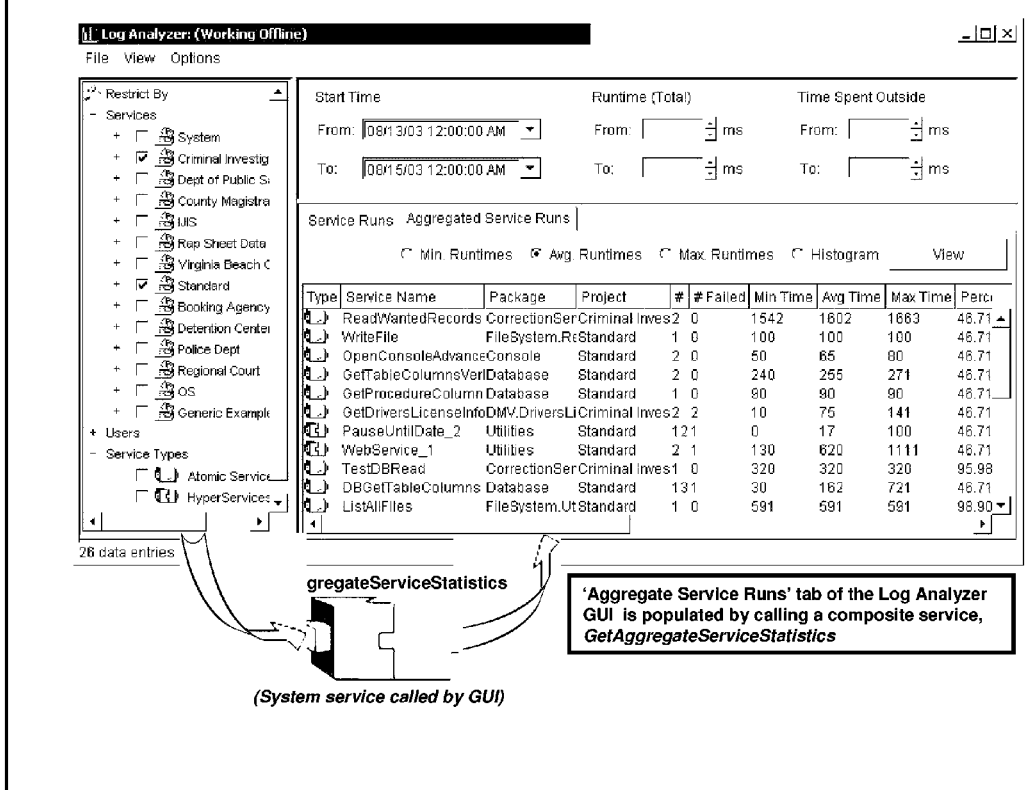

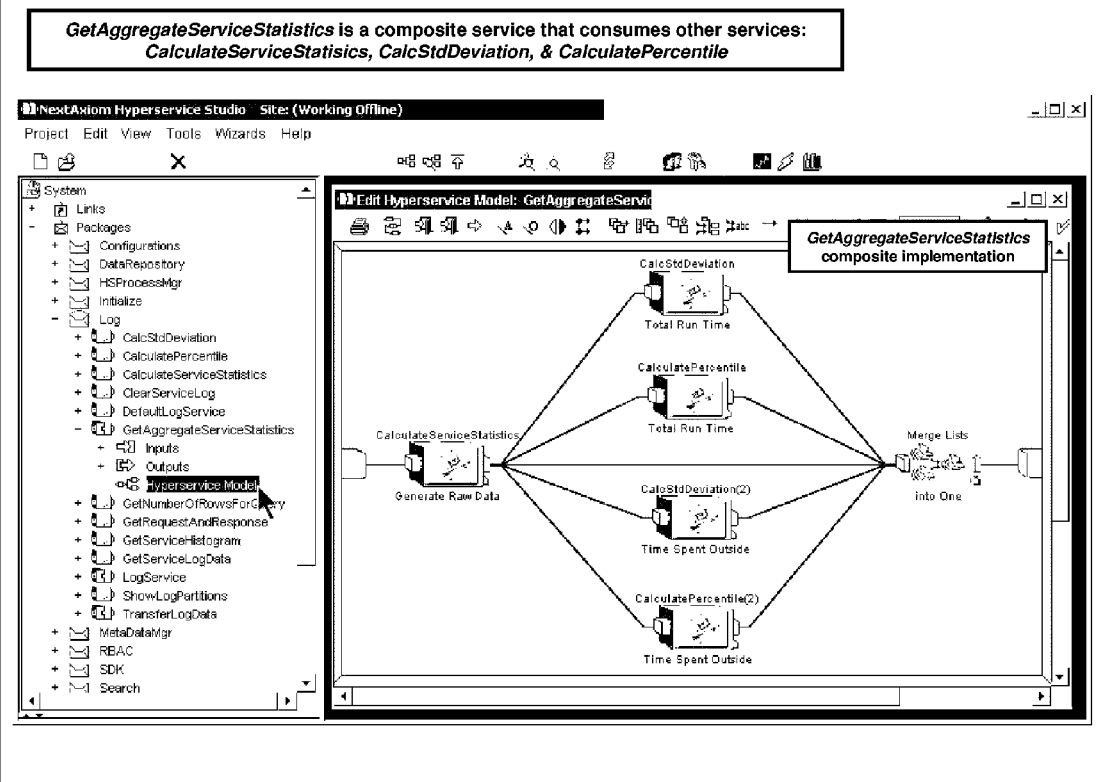

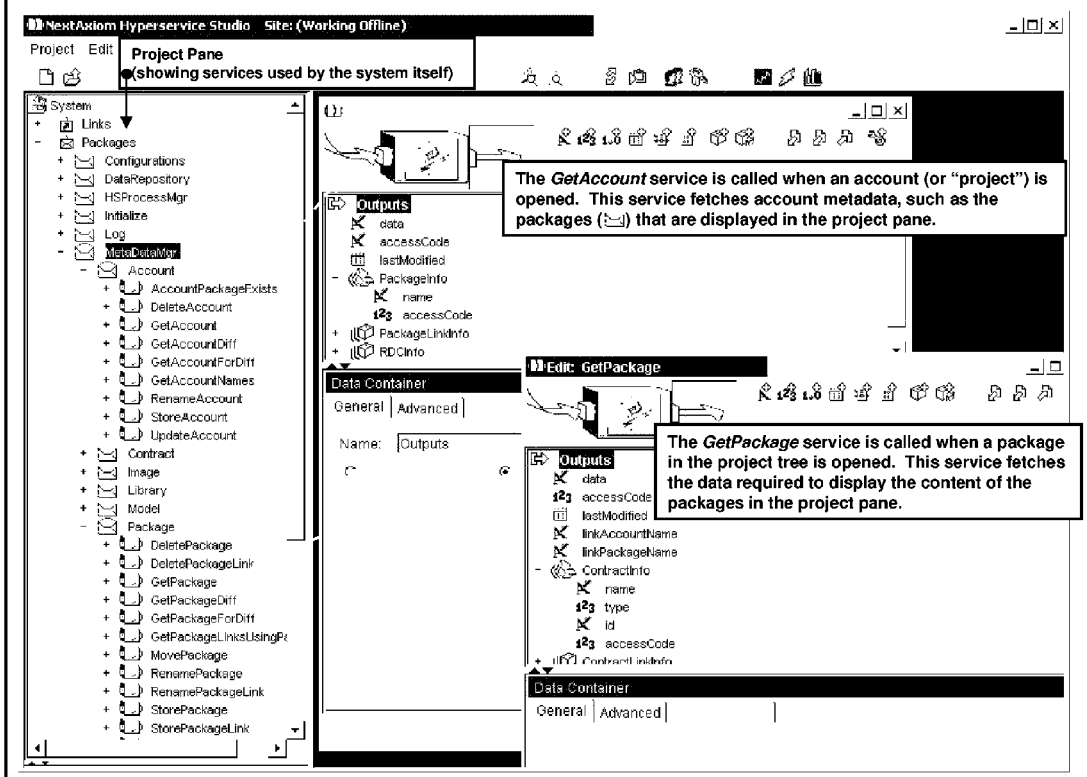

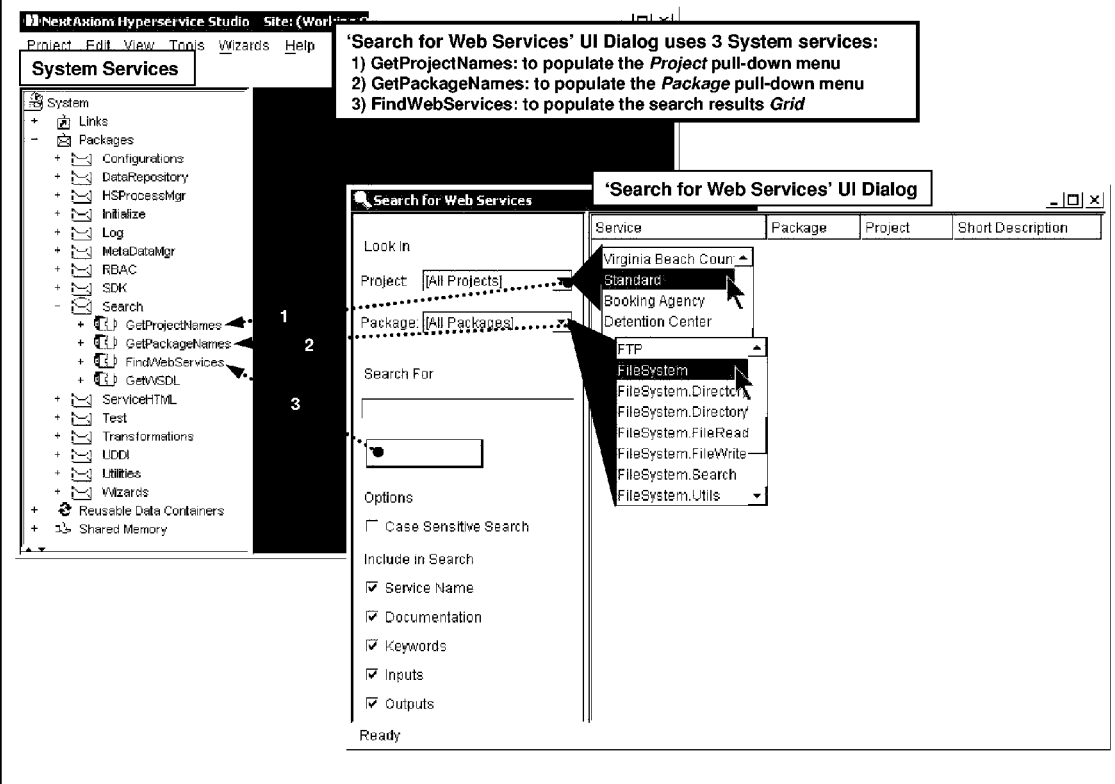

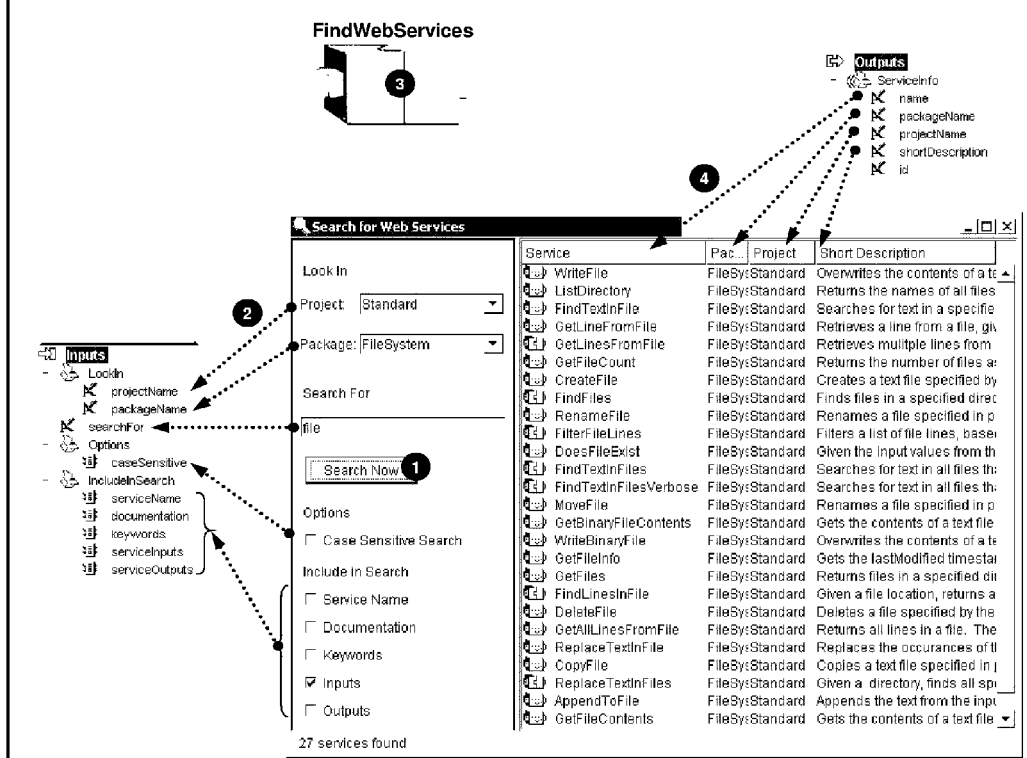

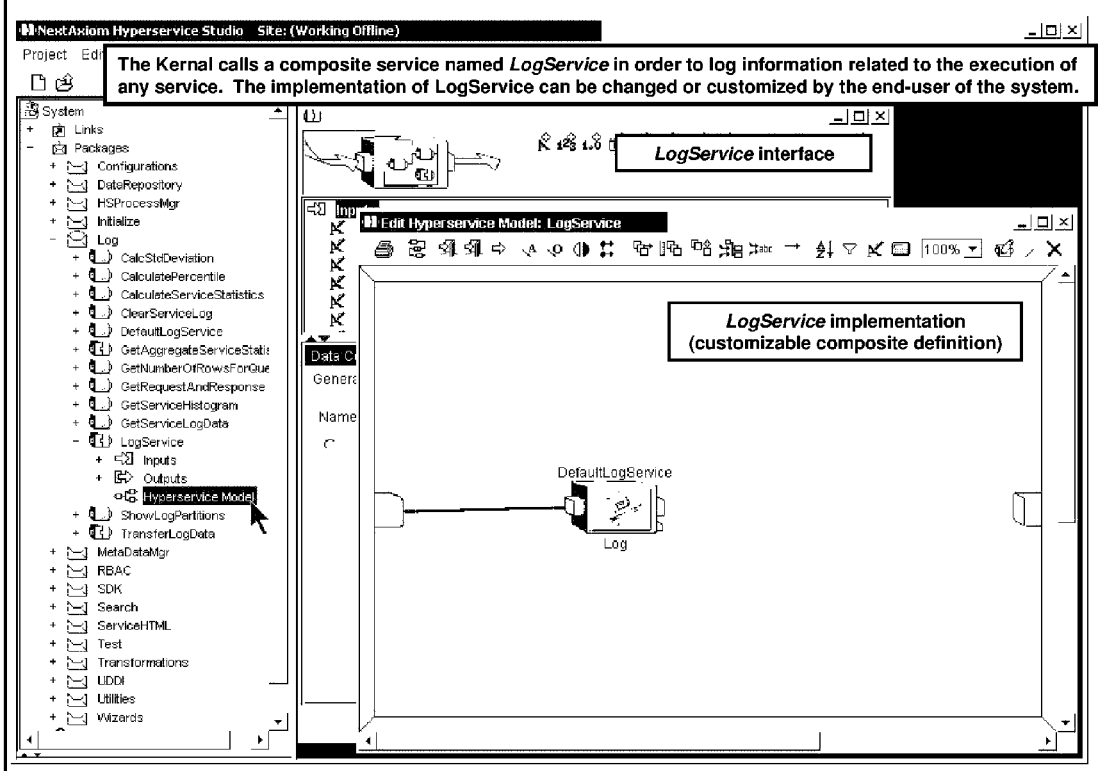

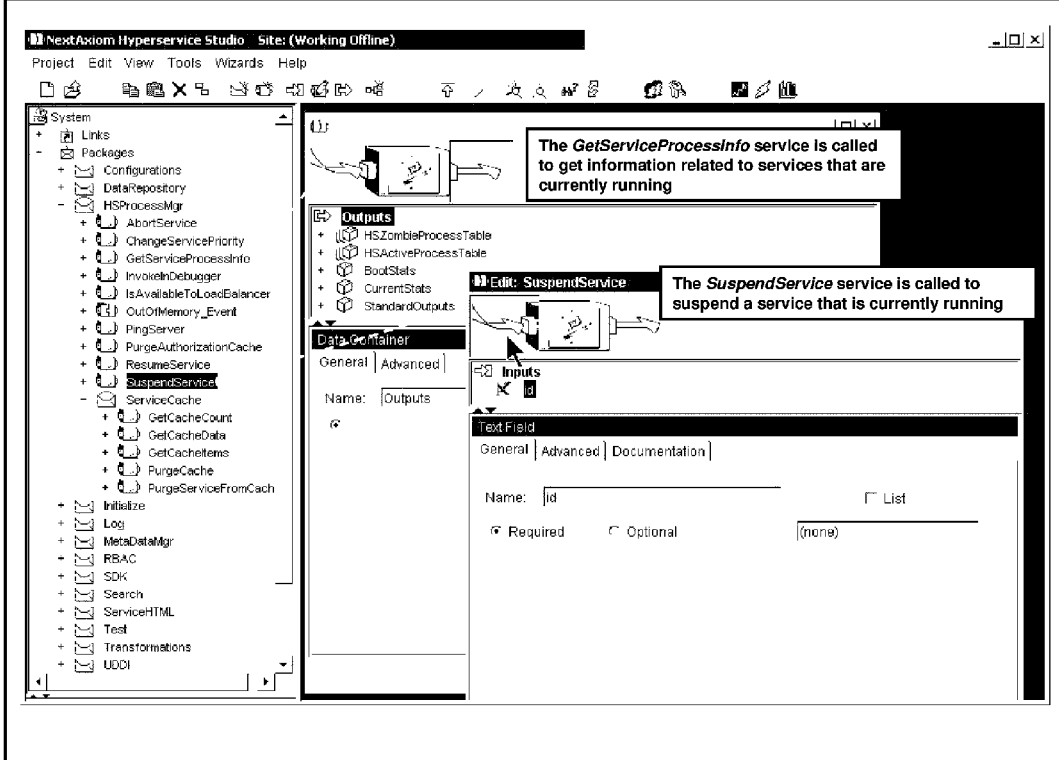
Figure 9a: Services provided for Service Process Monitoring & Management

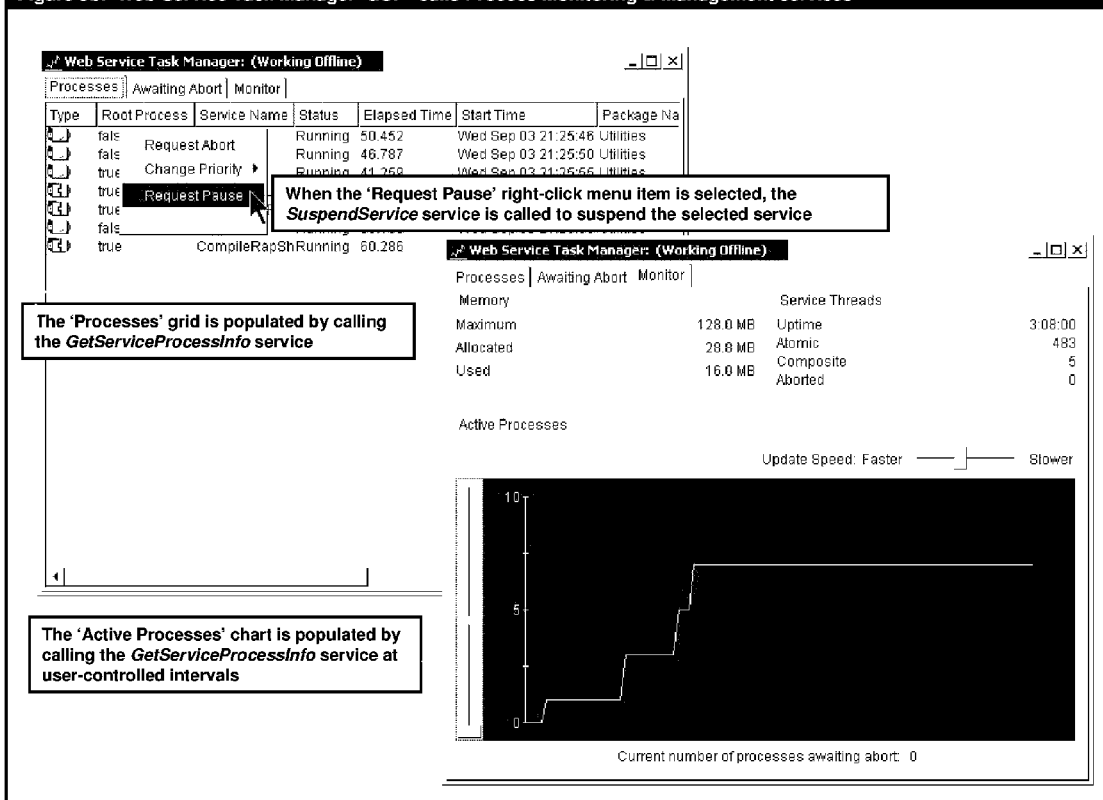

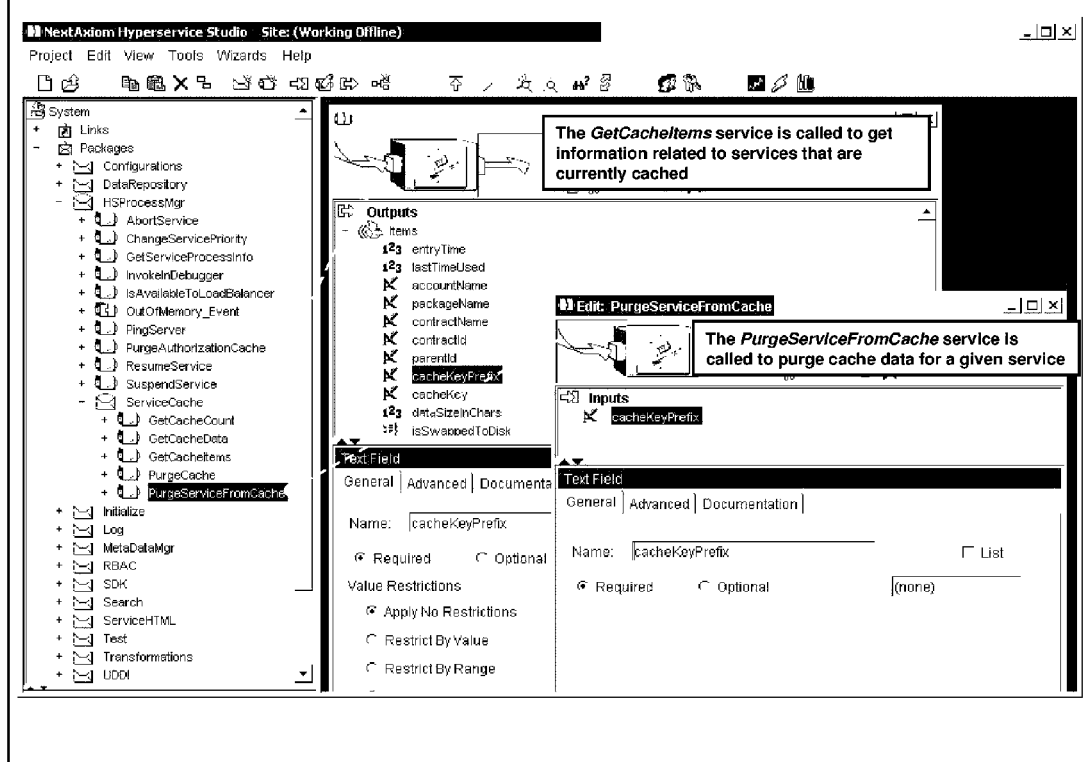

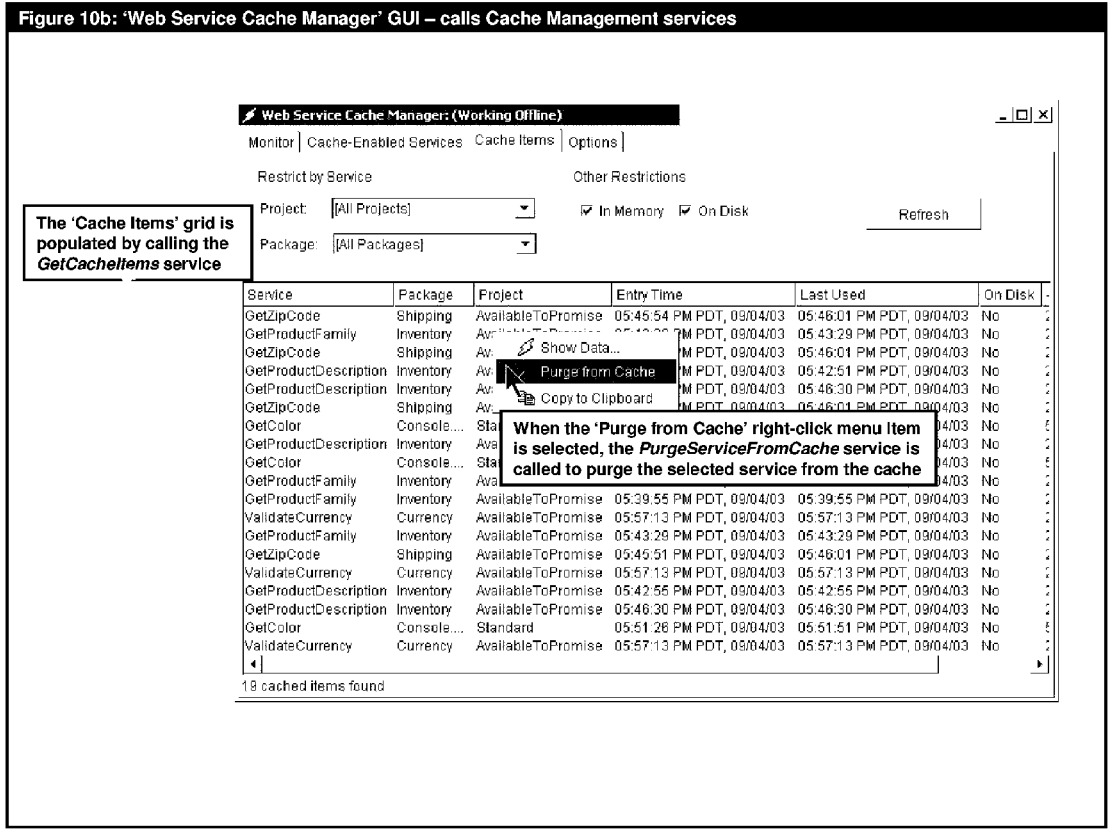

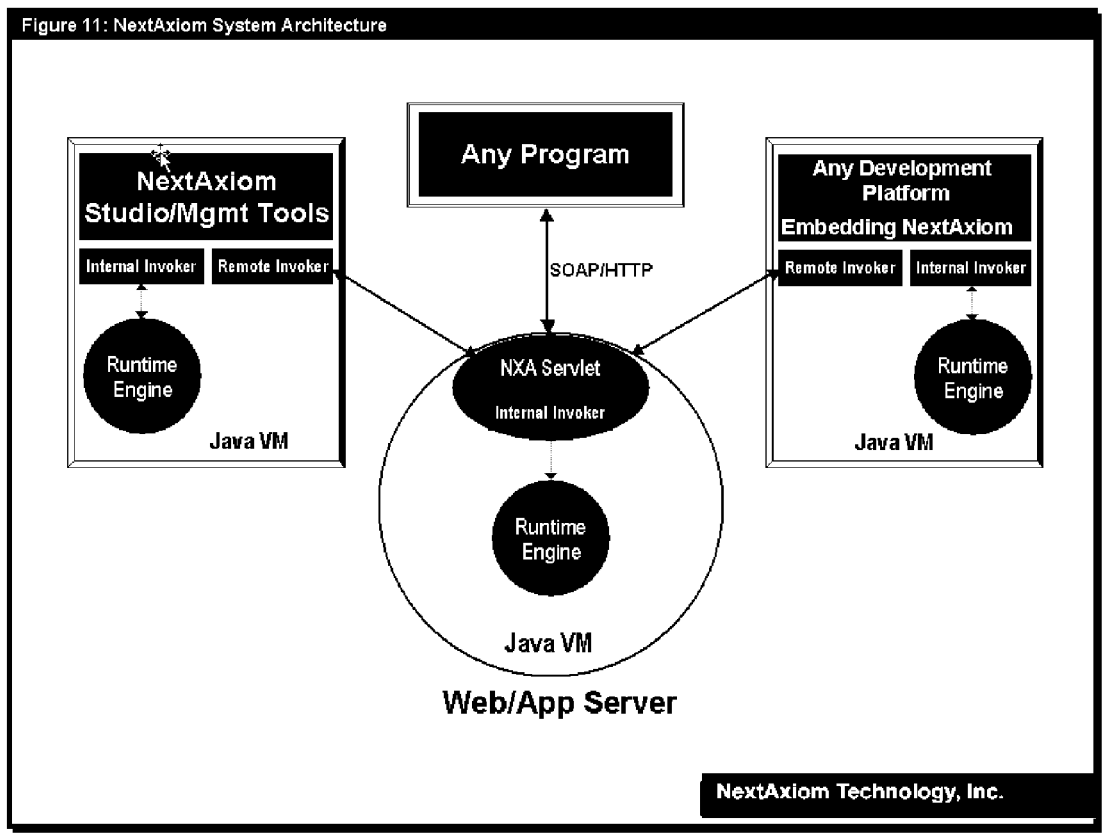

SYSTEM AND METHOD OF IMPLEMENTING A CUSTOMIZABLE SOFTWARE PLATFORM

CROSS-REFERENCES TO RELATED APPLICATIONS

This application claims the benefit of U.S. Provisional Application Ser. No. 60/481,444, filed on Sep. 30, 2003, entitled "A method of building a customizable software platform, for the management and development of service-oriented software modules, upon itself", which is incorporated herein by reference.

BACKGROUND OF THE INVENTION

1. Field of the Invention

The present invention relates to the field of computer software and, in particular, to a system and method of building a software platform that is used for management and development of service-oriented software modules and applications; this system and method leverages its own service-oriented artifacts in its own construction.

2. Description of the Related Art

Relational Database Management Systems (RDBMS) provide an example of a system that uses its own core artifacts as part of its own construction. For example, in most RDBMS, "system" tables are used to hold catalog and metadata information about all end user and system tables. The idea is that if database tables are a good way to hold data and metadata, the RDBMS itself should use it to hold its own information. Indeed, by using the system artifacts as part of the implementation of the system, the system inherits some of the benefits that it aims to provide the end user.

The current art of building software platforms that aim to provide service-oriented development and management capabilities do not utilize self-produced, service-oriented artifacts as a significant part of their construction. As a result, construction and customization of such platforms do not directly benefit from the advantages of service-oriented architecture and programming methods. The current art of implementing service-oriented development and/or management results in platforms that are too hard, impractical or even impossible to customize at a granular level.

SUMMARY OF THE INVENTION

A principle object of the present invention is to provide a method for constructing a customizable, service-oriented, software system that can be used for the management, development and assembly of software service modules including, but not limited to, "Web Services". A major distinguishing aspect of the method for constructing the software system is to use the functionality, frameworks and methods provided to the end-user of this software system, in constructing the functionality of the software system itself. In other words, portions of the software system are constructed upon the artifacts of the system and through the same tools that are provided for the end users of the system.

The present invention aims to leverage the end functionality of the software system to allow the users of the system to customize, replace, or extend the built-in features provided by the software system by applying the functionality, frameworks and methods provided to the end-users of the system. The present invention provides a method for the rapid convergence of quality of the software system under construction, while building and advancing the software system, through the compound reuse and leverage of its end-user functionality and its artifacts in building the software system itself.

Furthermore, the present invention significantly reduces the time for constructing, advancing and customizing the software system through the application of a service-oriented architecture and method that directly leverages the end-user functionality and artifacts of the software system.

The present invention provides a service-oriented method of communication to accomplish transparent distribution for the parts of the system as consumers of software services from the parts of the system as producers of software services. Furthermore, this method of communication provides a service-oriented method of broadcasting system and application events across distributed nodes of the software system.

Other objects and advantages of this invention will be set in part in the description and in the drawings that follow and, in part, will be obvious from the description or may be learned by practice of the invention. Accordingly, the drawings and description are to be regarded as illustrative in nature, and not as restrictive.

To achieve the forgoing objectives and in accordance with the purpose of the invention as broadly described herein, the present invention provides methods, frameworks, and systems for building a software system for the management, implementation and composition of service-oriented, software modules that are built themselves on top of service-oriented software modules leveraging its own artifacts and set of functionality in management, implementation and composition of software modules. In preferred embodiments, this technique comprises: 1) dividing the system into a core module, the Kernel, that provides a basic framework utilizing software interfaces with plug-able implementations for the dispatch of software service module implementation with a multi-threaded process abstraction; 2) use of said framework by the Kernel itself and the management and design tools to provide the rest of the functionality that the system needs in performing its own tasks including, but not limited to, metadata management, logging, cache management, system configuration, shared memory management, event broadcasting and notification, security and provisioning as a set of service modules dispatched by the Kernel.

The method further comprises a mechanism for the consumption of software modules, based on their interfaces, decoupled from the implementation module dispatched within the Kernel and appropriately abstracted to provide transparent distribution. The Graphical User Interface (GUI) portion of the system used for defining service interfaces, definition, composition and management tools, consumes "System" services to perform its function, while the implementation of the those services are dispatched by the Kernel and implemented through the same framework that is provided to the end-user for managing, implementing, deploying and developing any software service module. Each function for the system is first described using a set of service interface definitions using the system itself, while the GUI layer providing this function accesses the function through the consumption of software services based on the defined interfaces.

The present invention will now be described with reference to the following drawings, in which like reference numbers denote the same element throughout. It is intended that any other advantages and objects of the present invention that become apparent or obvious from the detailed description or illustrations contained herein are within the scope of the present invention.

BRIEF DESCRIPTION OF THE DRAWINGS

FIG. 1. A software service interface.
FIG. 2—Example composite model implementation.
FIG. 3—Exploded Composite service.
FIG. 4—Service oriented application architecture.
FIG. 5a—Log Analyzer—Graphical User Interface calls composite services.
FIG. 5b. Log Analyzer—get aggregate service statistics; an example composite service called by the GUI.
FIG. 6. Services used for Metadata management.
FIG. 7a. Search for Web Services GUI—calls System services.
FIG. 7b. 'Search for Web services' GUI—using 'FindWebServices' composite service.
FIG. 8. Logging service execution—kernel calls a customizable composite service.
FIG. 9a.—Services provided for Service Process Monitoring and management.
FIG. 9b.—'Web services task manger' GUI—calls Monitoring and Management Services.
FIG. 10a.—Services provided for Service Cache management.
FIG. 10b.—Web Service Cache Manager GUI—calls Cache Management services
FIG. 11.—NextAxiom System Architecture.

TERMS AND DEFINITIONS

A software service, or service for short, including but not limited to a Web service, is a discrete software task that has a well-defined interface and may be accessible over the local and/or public computer networks or maybe only available on a single machine. Web services can be published, discovered, described, and accessed using standard-based protocols such as UDDI, WSDL, and SOAP/HTTP.

A software service interface, in concept, represents the inputs and outputs of a black-boxed software service as well as the properties of that service, such as name and location. Take, for example, the interface of a simple software service named GetStockQuote, which retrieves simple stock quote information [FIG. 1]. This service takes a ticker symbol input and returns the last trade price amount as well as some additional stock quote details, such as the day high and day low. Note that in order to use, or consume, a service, only knowledge of its interface is required. This means that as long as the interface of a service remains the same, different implementations of the service can be swapped in and out without affecting its consumers. This, as well as the fact that a service is a language- and platform-neutral concept, is one of the keys to the flexibility of service-oriented architectures.

An atomic service is a software service that is implemented directly by a segment of software code. In the existing Next Axiom™ HyperService™ Platform, atomic Web services are dispatched via a library. A library is a light, language- and platform-neutral wrapper that is linked to one or more atomic Web service implementations. Atomic Web services are logically indivisible Web services that represent "raw materials" to the HyperService™ platform.

A composite service is a software service that consumes any number of other atomic or composite services. In the HyperService™ platform, a composite Web service is implemented with a metadata-driven model that is automatically interpreted by a high-performance run-time engine.

Visual metadata models, which represent composite software services implementations to the HyperService™ system, are created in a graphical, design-time environment and stored as XML models. This environment offers a new and powerful visual modeling paradigm that can be leveraged to enable the visual modeling of transactional behavior. This environment was specifically designed to enable collaborative, on-the-fly creation of software services by business process analysts or functional experts, who understand the business logic and application required to implement real-world business processes and applications, but have no knowledge of programming paradigms or Web service protocols. FIG. 2 captures the implementation of a composite software service named "Expedite 3000 Series". This service is used by a master planner to expedite 3000-series inventory items when they fall short on the shop floor. This service was developed collaboratively and reuses services that were selectively exposed by the Inventory and Purchasing departments to the developers of this service.

Any software service that is consumed by a composite service model is said to be "nested" or "embedded" within that composite service. FIG. 3 depicts a hypothetical composite service that resides in Chicago. This software service is composed of other composite services that are distributed across the country.

DESCRIPTION OF THE PREFERRED EMBODIMENTS

A service-oriented software development paradigm effectively encapsulates the graphical user interface (GUI) aspect of any software application from its application logic. Furthermore, the use of service-oriented standards provides an avenue for encapsulating and reusing the application logic from existing software assets such as databases, operating system functions, data files, application files, and existing IT applications. The pivot point of service-oriented encapsulation is the definition of the software service interfaces. The benefit of service-orientation can be summarized as increased architectural flexibility and customizability, quality, software component reuse, and a significant reduction in the time and cost required to develop software solutions.

The present invention discloses a method of implementing a system for dispatching service implementations and the management and composition of software service modules, that uses its dispatch, management, discovery and composition functionality provided to the end-users and the artifacts of the system in its own construction. Applying the present invention in the construction of NextAxiom's Hyperservice platform (available at www.nextaxiom.com), which includes a set of software development tools as well as a server infrastructure, has resulted in remarkable improvements in system quality, performance, flexibility, customizability, ease of distribution, and cost and time of implementation as compared to what can be expected from the traditional means of constructing software systems.

As depicted in FIG. 4, from the perspective of the present invention, a service-oriented application can be generally broken down into three layers: 1) interface, including the user interface related logic, 2) an optional composite application logic layer including assembly and aggregation of software services and the ability to add logic, and 3) a raw material software services layer (these are services that are indivisible from the perspective of the assembly and management system). These layers can be easily integrated through standards-based software service protocols, such as Web services or any proprietary protocol.

The system of the present invention follows the same general architectural pattern. For example, all the software tools provided by this system such as the log analyzer, as depicted in FIG. 5a and FIG. 5b, are composed of a graphical user interface, an optional composite application logic layer, and a set of raw material software services.

Any system or definition that references itself is circular by nature. For the purpose of the present invention, and to address this circularity, we define a portion of the system, hereon referred to as the Kernel, which breaks such circularity in avoiding infinitely recursive definitional references. Furthermore, we define the Kernel module as the core functional coordinator, software service dispatcher, and composition manager of the system of the present invention.

In one embodiment of the present invention, a service interface metadata management module, including a design-tool and the metadata management logic, is added to support the basic functionality of the system of the present invention. Since the system of the present invention pivots around the definition of software module interfaces, one of the first modules required for the construction of such a system is an interface metadata management module. As per the main claim of the present invention, this module is implemented through a set of raw material service interfaces, dispatched by the Kernel module of the system of the present invention, and a software GUI tool for the display, definition and modification of the defined interfaces, that communicates with the system of the present invention through a set of software interfaces designed to add, delete, update and get the metadata associated to the interfaces where the system of the present invention is the dispatcher of such services. Here, to further break the circularity, the only service interface definition that must be hard-coded within the Kernel is the service required for getting/fetching the definition of any other service.

Referring to the FIG. 6, you can see the interface design tool in the right pane of the GUI interface displaying the interface of the service used by the interface design tool to fetch the content of the left pane, that is the project pane. In the project pane, you can see the name of some of the other service interfaces for metadata management services used by the design-tools and the runtime platform (a.k.a. server) of the present invention to accommodate the end-user in designing any interface service definition for any software application.

In another embodiment of the present invention, a search tool, that provides granular service discovery functionality to the end-user of the system of the present invention, communicates with the system through a set of software interfaces, as depicted in FIG. 7a. Referring to FIG. 7b, you can see one of these services implemented as a composite software service, through the system's composition tool. The composite service is implemented by the Kernel and in-turn is assembled from a set of atomic services that are dispatched through the Kernel. Here, once again, we have demonstrated a functionality of the system of the present invention itself constructed through the same functionality used to provide functions to the end-users of the system.

In yet another embodiment of the present invention, the system of the present invention uses a set of service interfaces, as depicted in FIG. 8, to accommodate its service logging functionality. As an example, the Kernel invokes a log-related composite service to log the information about the invocation of any service. The composite service interface and definition are built through the composition and interface design tools of the system of the present invention. Inside the composite service, a raw material service for logging is embedded. At runtime, when a service is invoked through the system of the present invention, the Kernel may attempt to log the invocation of the service by invoking the composite log service which in-turn is executed by the Kernel. The user of the system of the present invention can customize the logging behavior of the system by modifying the composite definition of the logging service. This is an example of how the system of the present invention can be customized through its own end-user functionality.

In another embodiment of the present invention, the system of the present invention uses a set of service interfaces, as depicted in FIG. 9a, to accommodate its service monitoring and management functionality. Here, the service management tool, as depicted in FIG. 9b, invokes a service on the Kernel to gather information related to the currently running services or to change the attributes, such as priority, of the running services. The Kernel in-turn uses a trap mechanism, that traps named services based on the name associated to the implementation of the service to provide direct implementation for those services (in this case, the Kernel is both the dispatcher and the implementer of an atomic service).

In another embodiment of the present invention, the system of the present invention uses a set of software service interfaces, as depicted in FIG. 10a, to accommodate its service cache management functionality. The cache manager GUI, as depicted in FIG. 10b, communicates with the system through a set of service interfaces to monitor the cache, retrieve information about the currently cached service, selectively purge cached services, and perform other cache management functions. Upon the invocation of services corresponding to the related software interfaces by the cache management GUI, the Kernel dispatches the implementation of these services.

In yet another embodiment of the present invention, the system of the present invention uses a set of service interfaces to synchronize, persist, define and manage shared memory structures provided to the end-user of the system for inter-service communication. A panel used for the definition and management of a shared memory structure uses a set of service interfaces, dispatched by the Kernel at runtime, to store the definition of the shared memory together with its access control properties. As another example, a different set of services is used by the runtime system to synchronize the modifications performed to one instance of the system of the present invention with the in-memory image of another instance of the system of the present invention.

Other embodiments of this invention, include, but are not limited to: security management, provisioning, cluster management and other software products required by the system of the present invention for providing service interface and service module management, assembly and dispatch functionality.

Upon reference to the description of this invention it is apparent to one skilled in the art that any software product, management and design tool that needs to interact with the system of the present invention can use a set of software service interfaces to interact with the system and that the definition and implementation of those interfaces can be an artifact of the system that is dispatched (as atomic services) or implemented as composite services through the very same functions provided by the system to its end-users.

A further aspect of the present invention is in a layer of encapsulation that provides for the transparent distribution of service invocations. All the services in the system of the present invention are consumed through this layer of abstraction and are hereon referred to as the Invoker interface. Referring to FIG. 11, in one embodiment of the present invention, the Hyperservice Business Platform, the software service management and development tools communicate with the required runtime server through an Invoker abstraction. The "InternalInvoker" accesses the runtime environment in the same address space as the consumer of a service. The "RemoteInvoker" transparently goes through a network protocol layer to access the required runtime environment outside the address space of the consumer of a service. The "RemoteInvoker" may go through a standard protocol such as SOAP/HTTP or any other protocol such as a proprietary protocol. As an example for using the Invoker abstraction, the service log analyzer tool invokes (or consumes) all of the services used for communicating with the system of the present invention through an object implementing the Invoker interface. Two implementations of the Invoker interface are used within the system of this invention; 1) the first is referred to as the InternalInvoker that communicates with the Kernel module within the same computer address space (in other words, the InternalInvoker is in-memory with the Kernel module); 2) the second implementation of the Invoker, hereon referred to as the RemoteInvoker, assumes that the Kernel module of the system of this invention is outside of memory, in other words, it is not within the same computer address space. The RemoteInvoker serializes the invocation request for a software service, usually as, but not limited to, SOAP/XML, and communicates the serialized request usually over, but not limited to, the HTTP protocol. Then it receives the serialized response, including the outputs of the service, and de-serializes it back to the native object form of the requesting service. All operations handled by the Invokers are completely encapsulated from the user of the Invoker interface. In this way, the tools connected to the system of the present invention, can switch between offline InternalInvoker and different servers/runtime instances of the system of the current invention through an array of objects implementing the Invoker interface. Note that each RemoteInvoker instance can be uniquely identified by a separate URL.

Furthermore, the Kernel for the system of the present invention uses the Invoker abstraction to consume all of the system services required for implementing its own functionality such as metadata access, logging services, and others. This has profound implications in the distribution of this system of the present invention. For example, this implies that the Kernel of one instance of the system can access the metadata of another remote instance of the system by simply using a corresponding RemoteInvoker instead of its own InternalInvoker when consuming metadata data access service interfaces.

In another aspect, the present invention accommodates the service-oriented broadcast of messages and events across all the distributed instances of the system of the present invention. Here, each instance of the system that is aware of the address (URL) of other instances can create RemoteInvokers and broadcast any of the system services to all other instances of the system by re-invoking the same system through each RemoteInvoker. Furthermore, the two-way, asynchronous, service-oriented conversation of any two instances of the system can be accommodated through the addition of a callback invoker address (and security information) to each invocation. In this way instance 1 of the system can invoke a service on instance 2, while providing its own address as the callback address to instance 2. At a later time, instance 2 can invoke a service on instance 1 using the callback invoker address (and security information). One application of this method is to load-balance invocation requests for services without the need to replicate the service interface/composite service definition metadata across two distributed instances of the present invention. Here, instance 1 of the system delegates the consumption of a service to instance 2 of the system and provides an invoker callback address to instance 2 of the system. Instance 2 of the system uses the callback invoker address to instantiate an invoker to be used as the metadata manager. In this way, all the metadata requests for fulfilling the original request given to instance 2, by instance 1, are invoked through instance 1 of the system. Thus, using this approach there is no need for instance 2 of the system to have a duplicate of the metadata for invoking the service whose invocation was requested by instance 1.

The specific software tools and systems are representative examples only. Additional software tools and products may be included in the system of the present invention following the same method of dispatch, composition and communication between the software product and the system. The figures depicted herein are representative examples only. There may be many variations to these figures without departing from the essence of the invention.

Although the present invention has been described with reference to specific embodiments, this description is not to be construed in a limiting sense. Various modifications of the disclosed embodiment as well as alternative embodiments of the invention will become apparent to one skilled in the art upon reference to the description of the invention.

What is claimed is:

1. A system for construction of a customizable service oriented software system and framework, the system comprising:

a server infrastructure comprising a kernel having a hard-coded portion for getting or fetching service interface definitions; and a set of management and design tools stored on physical computer-readable media that, when executed by the server infrastructure, causes the system to perform management and development of service-oriented software modules as services, wherein the system uses service-oriented software service modules to perform system functions to enable operation of the system itself, wherein service interface definitions for the service-oriented software service modules that perform system functions are first described using the set of management and design tools and then consumed by the same set of management and design tools, wherein execution of the system functions includes the service-oriented software service modules of the system functions being implemented through the server infrastructure itself, wherein the kernel of the server infrastructure gets or fetches any service interface definitions for the service-oriented software service modules that perform system functions such that the kernel breaks circularity created when the service interface definitions reference the server infrastructure.

2. The system of claim 1, further comprising:

a communication module between the set of software management and design tools developed for supporting the system functions of the system and a runtime platform of the system through a set of service-oriented software service modules implemented through the same set of management and design tools provided to end-users of the system, wherein the communication module accomplishes transparent distribution for parts of the system that are consumers of service-oriented software services from parts of the system that are producers of service-oriented software services.

3. The system of claim 1, further comprising:
the server infrastructure and set of management and design tools configured to perform rapid convergence of quality during construction and advancement of the system functions through the same set of management and design tools provided to end-users of the system.

4. The system of claim 1, further comprising:
the server infrastructure and set of management and design tools configured to reduce an implementation time of the system functions through the same set of management and design tools provided to end-users of the system.

5. The system of claim 1, further comprising:
the server infrastructure and set of management and design tools configured to create a high-degree of customizability through exposure of system functions as consumable service-oriented software service modules through the same set of management and design tools provided to end-users of the system.

6. The system of claim 2, further comprising:
a service log manager tool for managing, viewing and analyzing the services dispatched through the system that uses a set of service-oriented software service modules to interact with the system through the same set of management and design tools provided to end-users of the system.

7. The system of claim 2, further comprising:
a service manager tool for managing current running services that uses a set of service-oriented software service modules to interact with the system through the same set of management and design tools provided to end-users of the system.

8. The system of claim 2, further comprising:
a service cache manager tool for managing cached services within the system that uses a set of service-oriented software service modules to interact with the system through the same set of management and design tools provided to end-users of the system.

9. The system of claim 2, further comprising:
a system shared-memory manager tool for managing content of the system shared memory that uses a set of service-oriented software service modules to interact with the system through the same set of management and design tools provided to end-users of the system.

10. The system of claim 2, further comprising:
a consumer account provisioning manager tool used to provision and deploy service-oriented solutions that uses a set of service-oriented software service modules to interact with the system through the same set of management and design tools provided to end-users of the system.

11. The system of claim 2, further comprising:
a security manager tool used for user and role management that uses a set of service-oriented software service modules to interact with the system through the same set of management and design tools provided to end-users of the system.

12. The system of claim 2, further comprising:
a system cluster manager used for load-balancing and managing clusters of the system that uses a set of service-oriented software service modules to interact with the cluster of systems through the same set of management and design tools provided to end-users of the system.

13. The system of claim 2, further comprising:
any management or design tool that needs to interact with the system to use a set of service-oriented software service modules to interact with the system through the same set of management and design tools provided to end-users of the system.

14. The system of claim 1, wherein the system is extended through a set of service-oriented software service modules to implement the system functions required for supporting the functionality of the system through the same set of management and design tools provided to end-users of the system.

15. The system of claim 1, wherein all system functions required for management, design and invocation of system functionality by the system are implemented as service-oriented software service modules through the same set of management and design tools provided to end-users of the system.

16. The system of claim 1, wherein the implementation of all of the system functions that are service-oriented software service modules can be replaced transparently for customizing the system functionality using the same set of management and design tools provided to end-users of the system.

17. In a computer network, a service-oriented development system for the composition and implementation of service-oriented software modules, the service-oriented development system itself being built on top of service-oriented software modules, the service-oriented development system comprising:
a) a user interface tool stored on physical computer-readable media that, when executed by one or more processors, causes the system to allow an end-user to develop, assemble, manage and/or execute implementation of service-oriented software modules; and
b) a run-time server comprising a kernel that provides a framework utilizing interfaces with pluggable implementations for dispatching the service-oriented software modules, the kernel comprising a hard-coded portion for getting or fetching a definition of any service-oriented software module,
each of the user interface tool and run-time server requiring system functions to enable the operation of the service-oriented development system, at least some of the system functions of the user interface tool and run-time server are implemented as service-oriented software service modules using the user interface tool to define definitions of the system functions that are service-oriented software service modules,
wherein the kernel is configured to implement the at least some system functions by invoking the service-oriented software service modules of the at least some system functions, wherein the kernel gets or fetches any definition for the service-oriented software service modules that perform system functions such that the kernel breaks circularity created when the definitions reference the run-time server.

18. The service-oriented development system as recited in claim 17, wherein the user-interface tool comprises a management tool for allowing an end-user to manage service-oriented software modules.

19. The service-oriented development system as recited in claim 17, wherein the at least some of the system functions of the user interface tool and the run-time server being themselves built to use service-oriented software service modules comprises at least one of:
service interface metadata management;
log analyzing;
searching;
service monitoring and management;

cache management;
system configuration;
shared memory management;
event broadcasting and notification;
security management;
provisioning; or
cluster management.

20. The service-oriented development system as recited in claim 17, wherein the user interface tool and run-time server allow the end-user to customize, replace, or extend one or more of the at least some of the system functions using the end-user functionality of the service-oriented development system.

21. The service-oriented development system as recited in claim 17, wherein the user interface tool and the run-time server allow the end-user to rapidly converge a quality of a software system under construction.

22. The service-oriented development system as recited in claim 17, wherein the user-interface tool consumes those system functions built as service-oriented software service modules, and wherein implementation of those services are dispatched by the kernel and implemented through the same framework that is provided to the end-user for developing, assembling, managing and/or executing implementation of service-oriented software modules.

23. The service-oriented development system as recited in claim 17, wherein the kernel is configured to dispatch service-oriented software modules implementation using a multi-threaded process abstraction.

24. In a network environment comprising a service-oriented development system for the composition, management, and implementation of service-oriented software modules, the service-oriented development system including a user-interface tool for allowing an end-user to develop, assemble, manage, and execute implementation of service-oriented software modules and including a runtime server for implementing service-oriented software modules, a method for transparently distributing service invocations of service-oriented software modules, the method comprising:
  using a user-interface tool of a service-oriented development system to define interface definitions for one or more service-oriented software service modules for performing a system function to enable operation of the service-oriented development system;
  using an invoker interface to request the one or more service-oriented software service modules for performing the system function to enable operation of the service-oriented development system, wherein, consuming a particular service-oriented software service module comprises generating an invocation request, and sending the invocation request to a kernel of a run-time server, the kernel having a hard-coded portion for getting or fetching service interface definitions;
  at the kernel, receiving the invocation request from the consumer of the service-oriented software service module, the consumer being the service-oriented development system, wherein the kernel of the run-time server gets or fetches any definitions for the service-oriented software service modules that perform system functions such that the kernel breaks circularity created when the definitions reference the run-time server;
  using a local invoker to access a runtime environment in a same address space as the consumer of the service-oriented software service module; and
  using a remote invoker to access a runtime environment outside the address space of the consumer of the service-oriented software service module, wherein at least one of the local invoker and remote invoker are used to invoke a service-oriented software service module for performing a system function of the service-oriented development system, wherein operation of the internal invoker and remote invoker are encapsulated from the implementer by the invoker interface such that the consumer is not aware whether the invocation request is being sent via the local invoker or the remote invoker, and wherein the kernel can switch between an offline internal invoker mode and one or more servers having remote invokers.

25. The method as recited in claim 24, wherein using a remote invoker to access a runtime environment outside the address space of the consumer of the service-oriented software service module further comprises:
  serializing the invocation request for the service-oriented software service module;
  communicating the serialized invocation request using a network protocol;
  receiving a serialized response including outputs related to the service-oriented software service module for which the invocation request was serialized; and
  deserializing the serialized response to a native object form of the requesting service-oriented software service module.

26. The method as recited in claim 25, wherein the kernel is the consumer of the service-oriented software service module and the service-oriented software service module is a system function of the kernel required to implement functionality of the kernel.

27. The method as recited in claim 26, wherein the system function comprises at least one of:
  service interface metadata management;
  log analyzing;
  searching;
  service monitoring and management;
  cache management;
  system configuration;
  shared memory management;
  event broadcasting and notification;
  security management;
  provisioning; or
  cluster management.

28. The method as recited in claim 24, wherein the kernel of one instance of the system can access metadata of another remote instance of the system by using a corresponding remote invoker instead of its own internal invoker when consuming metadata data access service interfaces.

29. The method as recited in claim 24, further comprising:
  identifying addresses of other instances of the system; and
  using the remote invoker to broadcast a message to other instances of the system.

30. The method as recited in claim 29, further comprising:
  including in the broadcast message a callback invoker address, such that the other instances of the system can return an invocation of a service to the kernel.

* * * * *

UNITED STATES PATENT AND TRADEMARK OFFICE
CERTIFICATE OF CORRECTION

PATENT NO. : 7,581,205 B1  
APPLICATION NO. : 10/711706  
DATED : August 25, 2009  
INVENTOR(S) : Arash Massoudi It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 643 days.

Signed and Sealed this

Fourteenth Day of September, 2010

David J. Kappos  
*Director of the United States Patent and Trademark Office*